March 28, 1961     C. EVANS     2,976,737
INDEXING AND MOUNTING MEANS
Filed July 7, 1958     2 Sheets-Sheet 1

INVENTOR.
CHARLES EVANS
BY
ATTORNEY

March 28, 1961   C. EVANS   2,976,737
INDEXING AND MOUNTING MEANS
Filed July 7, 1958   2 Sheets-Sheet 2

INVENTOR.
CHARLES EVANS
BY John H. Widdowson
ATTORNEY

United States Patent Office 2,976,737
Patented Mar. 28, 1961

2,976,737

INDEXING AND MOUNTING MEANS

Charles Evans, Rte. 1, Burden, Kans.

Filed July 7, 1958, Ser. No. 747,070

5 Claims. (Cl. 74—16)

This invention relates to mounting means, particularly means to mount a powering unit for a power tool and/or equipment. In a more specific aspect, this invention relates to mounting means for such a powering unit having therewith indexing means. In still a more specific aspect, this invention relates to new indexing and mounting means for a power unit having a motor with a power pulley and a pulley belt therefor, such motor and belt assembly operable to power a plurality of stationary power tools and/or equipment which is spaced around, over and/or under table supporting and positioning means, and such power tools and/or equipment having drive pulleys to operatively receive the belt which is powered by the motor.

It is old in the prior art to mount motors and other types of powering units on tables, platforms, frame supporting means, and the like. Further, it is known in the prior art to mount a plurality of power tools and/or equipment in spaced relation and drive the tools and/or equipment from a common powering unit or motor, for example, apparatus is known which mounts a plurality of such tools and/or equipment on a rotating turntable which moves the tools to an indexed position for driving by a motor centrally mounted of the purality of tools and/or equipment. And, of course, it is known in the prior art to drive a plurality of tools and/or equipment from a common shaft of the nature of a drive shaft which is powered by a single motor or other powering unit.

All of these methods and means of the prior art have their disadvantages. The apparatus which mounts power tools and the like rotatably relative to a fixed motor or powering unit is very complicated, expensive to build and maintain, and is not convenient to use. Paritcularly, tools cannot be positioned idealistically relative to shop space and the operation performed by the tool or equipment. The indexing means must be built into the turntable proper in operating combination with the means for rigidly mounting the motor or powering unit. This necess tates costly and inconvenient indexing. A rotating table which mounts and carries relative heavy tools and/or equipment and which rotates, requires an extraordinarily strong structure, and is subject to getting out of alignment with the motor power take-off frequently.

The new indexing and mounting means of my invention for a powering unit used to drive a plurality of power tools and/or equipment which are mounted in spaced relation overcomes all the disadvantages of the apparatus and devices of the prior art. The new index.ng and mounting apparatus of my invention is simple and easy to build, very portable, and convenient and easy to use and maintain. It is properly used with rigidly mounted and spaced power tools and/or equipment, and because of the rigidity of mounting, these tools can be much better mounted and positioned for use than in the apparatus of the prior art.

The new indexing and mounting means of my invention for a powering means which is used to power a plurality of power tools and/or equipment has a mounting member which is mountable tiltably and in turning relation to the plurality of power tools and/or equipment. This mounting member is constructed and adapted to receive and mount the powering means, and when so mounted it tilts and turns with the mounting member. The apparatus has means connected to the mounting member which are operable to tilt it, and thus the powering means. Indexing means with the mounting member are employed and they are operable to lock the mounting member in more than one position relative to means in which the mounting member is mounted in turning relation. The indexing and mounting means has means therewith which are constructed and operable to operate the indexing means.

It is an object of my invention to provide new indexing and mounting means for a powering unit.

It is another object of my invention to provide new indexing and mounting means for a powering unit operable to power a plurality of power tools and/or equipment which are mounted in spaced relation.

Still another object of my invention is to provide new indexing and mounting means for a power unit having a motor with a power pulley and a pulley belt therefor and operable to power a plurality of stationary power tools and/or equipment spaced around, over and/or under a table and having a drive pulley to operatively receive the pulley belt which is driven by the motor.

Still a further object of my invention is to provide simple and easy to build indexing and mounting means for a powering unit such as a motor, which is convenient to use, easy to maintain, and portable.

Other objects and advantages of the new indexing and mounting means for a powering unit of my invention will become apparent to those skilled in the art upon reading this disclosure.

Drawings accompany and are a part of this disclosure. These drawings depict preferred specific embodiments of the new indexing and mounting means for a power unit of my invention, and it is to be understood that the drawings are not to unduly limit the scope of my invention.

Figure 1:
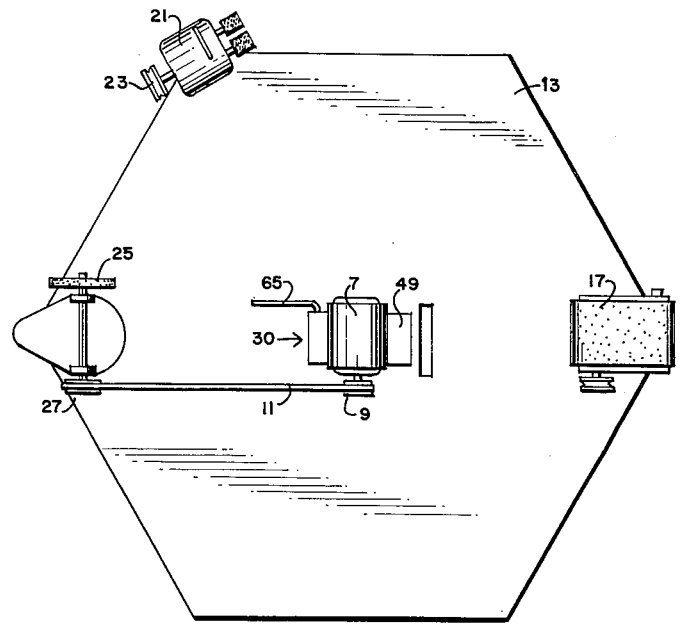
Fig. 1 is a top plan view of a preferred specific embodiment of the new indexing and mounting means for a motor of my invention, and showing such indexing and mounting means mounted in relation to three power tools mounted on and around a table in spaced relation.

Following is a discussion and description of the new indexing and mounting means of my invention for a powering unit. The description and discussion is made with reference to the drawings whereon the same reference numerals are used on the same or similar parts and/or structure, and reference is made to these numerals. It is to be understood that the following discussion and description is not to unduly limit the scope of my invention, because such discussion and description is of preferred specific embodiments of the new indexing and mounting means for a powering unit of my invention.

The new indexing and mounting means for a powering unit of my invention is particularly desirably used to tiltably and rotatably mount a motor 7. This motor 7 has a power pulley or take-off 9 which drives a pulley belt 11.

A pulley belt 11 is preferred, however, as one skilled in the art will appreciate, other driving and connecting means such as a sprocket and chain belt common to the art can be used, if desired. While in the drawings a pulley 9 is shown having a single belt track, a common cone pulley having multiple tracks can be used, and in some instances this will be advantageous, as set forth more clearly hereinafter, to eliminate the necessity of changing pulleys 9 for different size tool pulleys when using one belt 11 size.

Motor 7, drive pulley 9 and belt 11 individually drive and power tools and/or equipment spaced around, over and/or under a table 13, on which the power tools and/or equipment are mounted stationarily. The power tools and compressor 15 shown in the drawings are for explanatory purposes only, and it is to be understood that any power tools and/or equipment can be employed with the new indexing and mounting means for motor 7 of my invention. The power tools are a sander 17 having pulley 19 to receive operatably belt 11, a sheet metal worker 21 having drive pulley 23 to receive belt 11, and a grinder 25 having drive pulley 27 to receive pulley belt 11. Compressor 15 has drive pulley 16 to receive belt 11, and compressor 15 is mounted on a lower platform 31, which is supported by legs 33 of the table.

Figure 3:
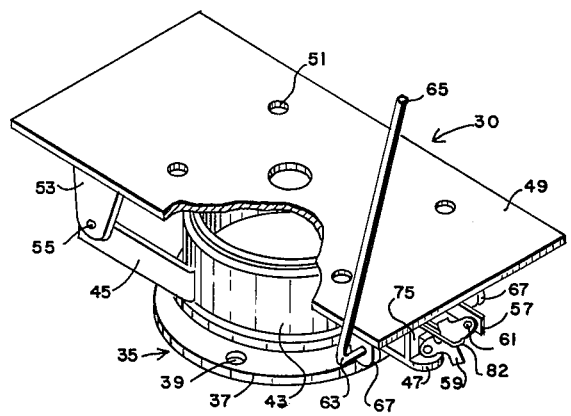
Fig. 3 is a perspective view, partly cut away, and enlarged, of the indexing and mounting means shown in Figs. 1 and 2.
Figure 5:
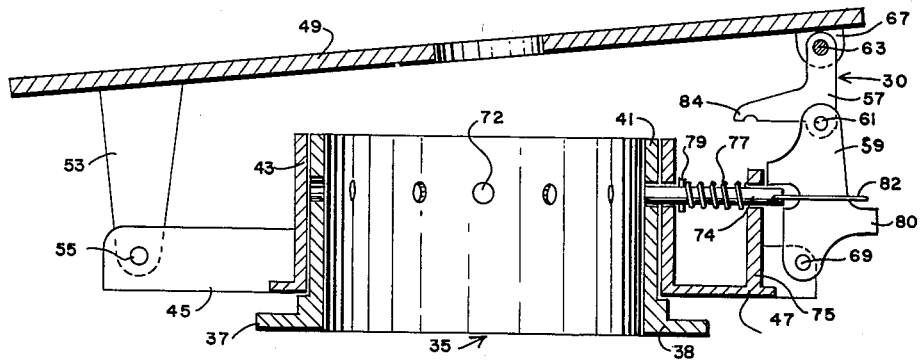
Fig. 5 is a longitudinal cross-sectional elevation view of the indexing and mounting means, with the linking assembly to the right shown in side elevation.
Figure 4:
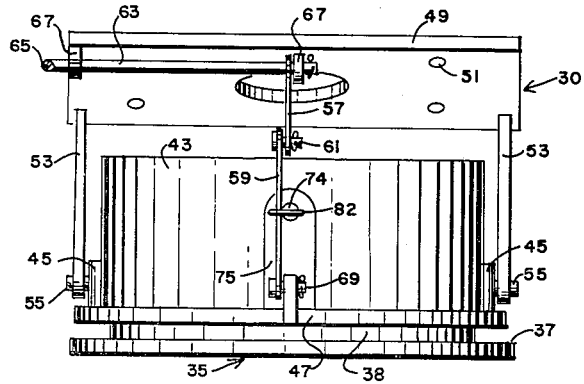
Fig. 4 is an end elevation view of the indexing and mounting means with the operator in down position, the position opposite to the up position shown in Fig. 3.

Indexing and mounting means 30, shown in detail in Figs. 3, 4 and 5 of the drawings, is a preferred specific structure of my invention. It has a base member 35 which has a lower flange 37 having a plurality of holes 39 therein. Common bolt and nut means (not shown) passes through the holes 39 to mount the base 35 on tabletop 13, such tabletop having corresponding holes therein (not shown). The base is rigidly mounted on tabletop 13. Of course, it can be welded thereto, if desired. The circular base member 35 has a shoulder portion 38, and an upper cylindrical neck portion 41 which projects upwardly when the base member 35 is mounted on tabletop 13.

A cylindrical collar member 43 is mounted on the cylindrical neck portion 41 of base member 35 to rotate thereabout in operation. If desired, several base members 35 can be used mounted on several tables or benches 13, and one collar member 43 and power means 7 mounted thereby can be moved from one to another, as desired, to operate a great number of tools and/or equipment. A pair of spaced and projecting arm members 45 are rigidly attached to collar 43 in any suitable manner, or they can be integrally formed therewith, and these arm members 45 turn with collar 43. An arm member 47 is attached to and projects from the other side or the portion opposite of collar 43, and as set forth hereinafter, this arm 47 mounts linking assembly and indexing means for the apparatus of my invention.

A mounting plate or platform 49 is tiltably mounted on arm members 45 and 47, and such mounting results in a platform 49 rotating and turning with collar member 43. The plate or platform 49 is constructed to receive and mount motor 7 so that the motor will tilt with the plate 49 and turn with same. Holes 51 in plate 49 receive nut and bolt means to mount the base of the motor on the platform or plate. Two spaced and downwardly projecting leg members 53 are suitably attached to the underside of plate or platform 49, and these are pivotally mounted on arm members 45 by pins 55.

An upper linking member 57 and a lower linking member 59 are pivotally joined by a pin 61. The upper linking member 57 is fixed in any suitable manner, such as by welding, to a shaft 63 having an operating handle 65 integral therewith, such shaft being pivotally mounted in spaced brackets 67 fixed to the underneath side of plate or platform 49. Thus, when handle 65 is operated to turn shaft 63, link 57 turns to in turn pivot the lower link 59. This lower link 59 is pivoted to arm member 47 by pin 69.

Figure 2:
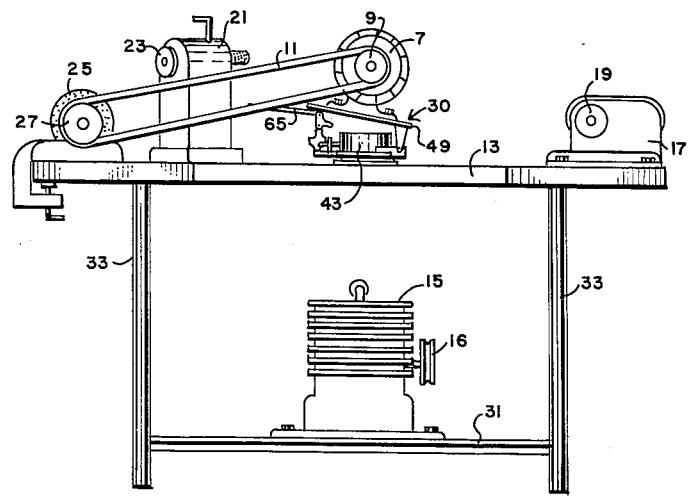
Fig. 2 is a side elevation view of Fig. 1, showing schematically a compressor mounted below the top of the table and positioned to be driven by the motor indexed and mounted by the new means of my invention.

When handle 65 is in the position of Figs. 1, 2 and 4, plate 49 and thus motor 7 is in tilted position (Fig. 5) and belt 11 will be tight on drive pulley 9 of motor 7 and the pulley on the power tool and/or equipment upon which belt 11 is mounted. Moving handle 64 to the position of Fig. 3 of the drawings, approximately places platform or plate 49 in horizontal position, thus loosening belt 11, and allowing for removing belt 11 from the drive pulley of the power tools and/or equipment. Therefore, by merely tilting platform or plate 49 through the use of handle 65 operator and the linking assembly 57 and 59, the motor 7 is placed in operating position in relation to the tools and/or equipment. Also, I have found it very advantageous to use the mounting means and the pulley belt 11 as a clutch to start and stop the tool being driven, tilting platform 49 with handle 65 engaging and disengaging belt 11 in operation.

The cylindrical and upwardly projecting neck portion 41 of base member 35 has a row of spaced indexing holes 72 therein. Collar member 43 has a hole therein which is alignable with holes 72 in neck portion 41 of base 35. A pin 74 is slidably mounted in the hole in collar 43, such pin 74 being extendable into one of the holes 72 in neck portion 41 of base member 35, as desired, to lock the collar 43 and base 35 against turning of the collar 43 on the base. The other end of pin 74 is slidably mounted in an aperture in an upright portion 75 of the arm member 47. This mounts and supports pin 74. A helical spring 77 acting in compression is mounted around pin 74, and held thereon in operative position by portion 75 of arm 47 and a pin 79 through operating pin 74. This helical spring 77 urges pin 74 into extended position, so that when the hole in collar 43 and one of the indexing holes 72 in neck portion 41 of base 35 coincide, pin 74 will extend to lock the members against relative movement.

Lower link member 59 has an outwardly projecting portion 80. On this portion 80 rests a connecting member 82 which passes through the outer end of pin 74, so that when link 57 pivots member 82 will move outwardly to retract pin 74. Also, a projecting portion 84 of upper link 57 when in pivoted position, contacts link 82 to finally extend it to fully retract pin 74, to withdraw the outer end of same from one of the holes 72. This occurs when plate or platform 49 is tilted to the position of Fig. 3, the substantially horizontal position, and when in such position collar 43 can be turned on neck portion 41 of base 35 to move the plate or platform 49 and motor 7 to a new position, as desired, to drive a particular tool and/or equipment. Thus, a great number of stationary mounted power tools and/or equipment can be individually driven by one motor 7 through the use of the new indexing and mounting means of my invention. And, as can easily be seen by those skilled in the art, the power means 7 can be electrically driven or by fuel such as gasoline, without the necessity of starting and stopping to switch power tools or equipment driven, since the drive belt 11 can be disengaged and the motor or engine turned to another position while running.

As will be evident to those skilled in the art, various modifications of this invention can be made, or followed, in the light of this disclosure and discussion, without departing from the spirit or scope of the disclosure or from the scope of the claims.

I claim:

1. Indexing and mounting means for a power unit having a motor with a power pulley and a pulley belt therefor and operatable to power one of a plurality of stationary power tools and/or equipment spaced around, over and/or under a table and each having a drive pulley to operatively receive said belt, comprising, in combination, a base member rigidly mountable on said table and having a cylindrical neck portion projecting upwardly when said base member is mounted on said table, a cylindrical collar member rotatably mounted on said neck portion of said base member, a pair of spaced and projecting arm members attached to said collar member to turn therewith and an oppositely mounted and projecting arm member so attached to said collar member, a mounting plate tiltably mounted on said arm members to turn with said collar member, said plate constructed to receive and mount a motor to tilt therewith and having a pair of leg members attached thereto pivotally connected to said pair of arm members, a plurality of pivotally joined linking members pivotally connected to said mounting plate and said oppositely mounted arm member, an operator connected to said linking members to operate same and to move said plate from a tilted position to approximately a horizontal position and vice versa upon operation, a row of spaced indexing apertures around said neck portion of said base member and an aperture in said collar member alignable with said indexing apertures, pin means slidably mounted in said last-named aperture and on said last-named arm member and extendable into said indexing apertures to lock said collar member relative to said base member, spring means mounted on said pin and engaging said last-named arm member and urging said pin means into said indexing apertures, and said linking members constructed to engage said pin means upon operation of said operator to retract said pin means from said indexing apertures.

2. Indexing and mounting means for a power unit having a motor with a power pulley and a pulley belt therefor and operatable to power one of a plurality of power tools mounted on or around a table in spaced relation and each having a drive pulley to operatively receive said belt, comprising, in combination, a base member mountable on said table and having a neck portion projecting upwardly when said base member is mounted on said table, a collar member mounted on said neck portion of said base member to turn relatively thereto, a plurality of arm members movable with said collar member and projecting therefrom, at least one of which being approximately opposite from at least one other of said arm members, a mounting member tiltably mounted on said arm members and pivotally attached thereto, said mounting member constructed to receive and mount a motor to tilt therewith, a pivotally joined linking assembly connecting said mounting member and one of said arm members, an operator connected to said linking assembly to operate same and to move said mounting member from a tilted position to approximately a horizontal position and vice versa upon operation, spaced indexing apertures in said neck portion of said base member and an aperture in said collar member alignable with said indexing apertures, pin means slidably mounted in said last-named aperture and in operating proximity to said linking assembly, said pin means extendable into said indexing apertures in said neck portion of said base member to lock said collar member relative to said base member, spring means operatively attached to said pin means and urging said pin means into extended position, and said linking assembly constructed to engage said pin means upon operation of said operator to retract said pin means from said indexing apertures.

3. Indexing and mounting means for a powering means for one of a plurality of power tools and/or equipment, comprising, in combination, a base mountable on a substantially horizontal surface and in spaced relation to a plurality of power tools and/or equipment, an intermediate mounting member mounted on said base to turn relative thereto, an upper mounting member tiltably mounted on said intermediate mounting member and to turn therewith, said upper mounting member constructed to receive and mount powering means to tilt therewith, a pivotally joined linking assembly pivotally connected to said upper and intermediate mounting members and having means therewith to operate said linking assembly to tilt said upper mounting member, an aperture in said intermediate mounting member, pin means slidably mounted in said aperture, a plurality of indexing apertures in said base constructed to receive said pin means to lock said intermediate mounting member relative to said base, means urging said pin means into said indexing apertures, and said linking assembly constructed to engage said pin means upon operation to retract said pin means from said indexing apertures.

4. Indexing and mounting means for one of powering means for a plurality of power tools and/or equipment, comprising, in combination, a base mountable substantially horizontal relative to mounting means therefore, a mounting member having a portion tiltably mounted on said base and to turn relative thereto, said mounting member constructed to receive and mount a powering means for a plurality of power tools and/or equipment which are in spaced relation to each other, means operatively connected to said mounting member to tilt same upon operation, indexing means with said mounting member and said base to lock said mounting member and said base together in more than one position, other means urging said indexing means into locked position, and said means operatable to tilt said mounting member, operatable to move said indexing means out of locked position.

5. Indexing and mounting means for a powering means for one of a plurality of power tools and/or equipment, comprising, in combination, a base mountable in a substantially horizontal position and in spaced relation to a plurality of power tools and/or equipment, a tiltable mounting member carried by said base to tilt and turn otherwise relative thereto, said mounting member being constructed and adapted to receive and mount powering means for a plurality of said power tools and/or equipment, indexing means with said base and said mounting member constructed and operative to lock same in more than one rotative position relative to each other, and other means operatively connected to said mounting member and said indexing means to upon operation tilt said mounting member and operate said indexing means.

References Cited in the file of this patent

UNITED STATES PATENTS

| | | |
|---|---|---|
| 1,803,402 | Napier | May 5, 1931 |
| 2,084,234 | Anderson | June 15, 1937 |
| 2,495,250 | Gilly | Jan. 25, 1950 |
| 2,567,127 | Shoffner | Sept. 4, 1951 |
| 2,603,975 | Shoffner | July 22, 1952 |